(12) United States Patent
Howard (10) Patent No.: US 10,765,915 B2
(45) Date of Patent: Sep. 8, 2020

(54) STATIONARY JUMPING AND TRICK BIKE

(71) Applicant: Matthew James Howard, Brighton, CO (US)

(72) Inventor: Matthew James Howard, Brighton, CO (US)

( * ) Notice: Subject to any disclaimer, the term of this patent is extended or adjusted under 35 U.S.C. 154(b) by 0 days.

(21) Appl. No.: 16/241,418

(22) Filed: Jan. 7, 2019

(65) Prior Publication Data

US 2019/0209894 A1 Jul. 11, 2019

Related U.S. Application Data

(60) Provisional application No. 62/615,769, filed on Jan. 10, 2018.

(51) Int. Cl.
| | |
|---|---|
| *A63B 25/08* | (2006.01) |
| *B62K 17/00* | (2006.01) |
| *A63B 1/00* | (2006.01) |

(52) U.S. Cl.
CPC ............. *A63B 25/08* (2013.01); *A63B 1/00* (2013.01); *B62K 17/00* (2013.01); *B62K 2201/06* (2013.01)

(58) Field of Classification Search
CPC ...... B62K 17/00; B62K 2201/06; A63B 1/00; A63B 5/00; A63B 25/08; A63B 2022/0092
USPC .......................................................... 482/77
See application file for complete search history.

(56) References Cited

U.S. PATENT DOCUMENTS

| | | | | |
|---|---|---|---|---|
| 3,694,004 | A | * 9/1972 | Siebers | .................. B62K 25/02 280/277 |
| 4,046,396 | A | * 9/1977 | Taylor | .................... B62K 19/10 280/281.1 |
| 5,301,969 | A | 4/1994 | Bynoe | |
| 5,496,237 | A | 3/1996 | Hensley | |
| 5,816,356 | A | * 10/1998 | Jansson | ................ B62K 25/283 180/227 |
| 6,390,956 | B1 | * 5/2002 | Seelye | .................. A63B 25/08 482/128 |
| 6,910,702 | B1 | * 6/2005 | Hals | ........................ B62K 21/20 280/283 |
| 7,240,908 | B2 | 7/2007 | Sankrithi | |
| 8,523,213 | B2 | * 9/2013 | Raphael | ................... B62K 5/02 280/278 |
| 9,079,628 | B2 | 7/2015 | O'Neil | |
| 2003/0045405 | A1 | * 3/2003 | Lin | ......................... A63B 25/08 482/77 |

(Continued)

Primary Examiner — Loan B Jimenez
Assistant Examiner — Thao N Do
(74) Attorney, Agent, or Firm — Trenner Law Firm, LLC; Mark D. Trenner (57) ABSTRACT

A stationary jumping and trick bike is disclosed. An example device includes a frame assembly having a handlebar on a forward portion of the frame assembly and a seat on the frame assembly. A leg member including a leaf spring is connected to the frame assembly by a bracket having a plurality of ports selectable for pivotably attaching the leg member to the frame assembly to adjust pitch and/or angle of attachment of the leg member. A plurality of tensioners are connected between the leg member and the frame assembly. A foot rest is provided on the frame assembly. A standing and/or seated user holding the handlebar on the frame assembly can practice jumps and tricks by lifting and landing a lower portion of the leg member on a solid surface.

20 Claims, 7 Drawing Sheets

(56) References Cited

U.S. PATENT DOCUMENTS

| | | | |
|---|---|---|---|
| 2003/0087732 A1* | 5/2003 | Musachia | A63B 25/08 482/77 |
| 2008/0284125 A1* | 11/2008 | Ramm | B62K 3/002 280/263 |
| 2009/0140503 A1* | 6/2009 | Kolesar | B61B 11/008 280/16 |
| 2010/0225088 A1* | 9/2010 | Wernli | B62K 3/002 280/266 |
| 2014/0054870 A1* | 2/2014 | Wernli | B62K 5/08 280/87.043 |
| 2014/0265231 A1* | 9/2014 | D'Aluisio | B62K 25/28 280/284 |
| 2015/0232149 A1* | 8/2015 | Song | B62K 3/002 280/215 |
| 2016/0362156 A1 | 12/2016 | Song et al. | |

* cited by examiner

STATIONARY JUMPING AND TRICK BIKE

CROSS REFERENCE TO RELATED APPLICATIONS

This application claims the priority benefit of U.S. Provisional Patent Application No. 62/615,769 filed Jan. 10, 2018 for "Stationary Jumping and Trick Bike" of Matthew James Howard, hereby incorporated by reference in its entirety as though fully set forth herein.

BACKGROUND

Training devices, such as stationary bikes, are available so that the user does not have to go to a dedicated training facility or park when lack of time or distance is the issue. Some of these devices for jumping and tricks, require the rider to lay on his or her back and perform certain maneuvers and tricks from that position. However, there is a risk of injury. There are also other devices which involve using a bike or partial bike on a trampoline. However, this requires quite a bit of space to setup and use (typically outdoors), and again there is a risk of injury.

DETAILED DESCRIPTION

A stationary jumping and trick bike is disclosed which enables practice and training in a confined space, with less risk of injury than other techniques and/or devices (e.g., jumps and ramps). The "bike" disclosed herein is a "bicycle-like" apparatus which may introduce users to a new recreational activity/sport. It may also be implemented as an alternative tool for all types of bicycle enthusiasts/athletes to practice tricks/maneuvers. It can be enjoyed by anyone who is interested in a new, exciting, and fun activity/sport.

An example of the stationary jumping and trick bike is a stationary apparatus which includes a leaf spring (or other mechanical or non-mechanical spring such as air spring technology) that takes the place of the back wheel of a traditional bike. There is also no front wheel or fork. The example stationary jumping and trick bike also includes a base in which pedals can be installed into pedal ports to the riders preference. Other examples include pegs and pedals (without crank arms which come straight out of the bottom bracket), or crank arms with pedals and the option to either lock crank arms in position or add tension to keep them from moving freely. Riders can hop and jump from a stationary position while performing certain maneuvers and tricks that are commonly executed on BMX or MTB bicycles.

In an example, the stationary jumping and trick bike includes a frame assembly having a handlebar on a forward portion of the frame assembly and a seat on the frame assembly. A leg member (e.g., having a leaf spring) is connected to the frame assembly by a bracket having a plurality of ports. The ports are selectable for pivotably attaching the leg member to the frame assembly to adjust pitch and/or angle of attachment of the leg member. A plurality of tensioners are connected between the leg member and the frame assembly. If the user is comfortable with the tension of the leaf spring alone, the device can be provided without any tensioners or springs. A foot rest (e.g., pedal(s) or peg(s)) is provided on the frame assembly.

A standing and/or seated user holding the handlebar on the frame assembly can practice jumps and tricks by lifting and landing a lower portion of the leg member on a solid surface. However, it is noted that it may be difficult for a user to perform while seated. Just like many bicycle sports, the seat is more of a means to control the bike by the user's knees. Seats also assist in performing certain bicycle tricks and maneuvers while not in a seated position.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein. The operations shown and described herein are provided to illustrate example implementations. It is noted that the operations are not limited to the ordering shown. Still other operations may also be implemented.

Figure 1:
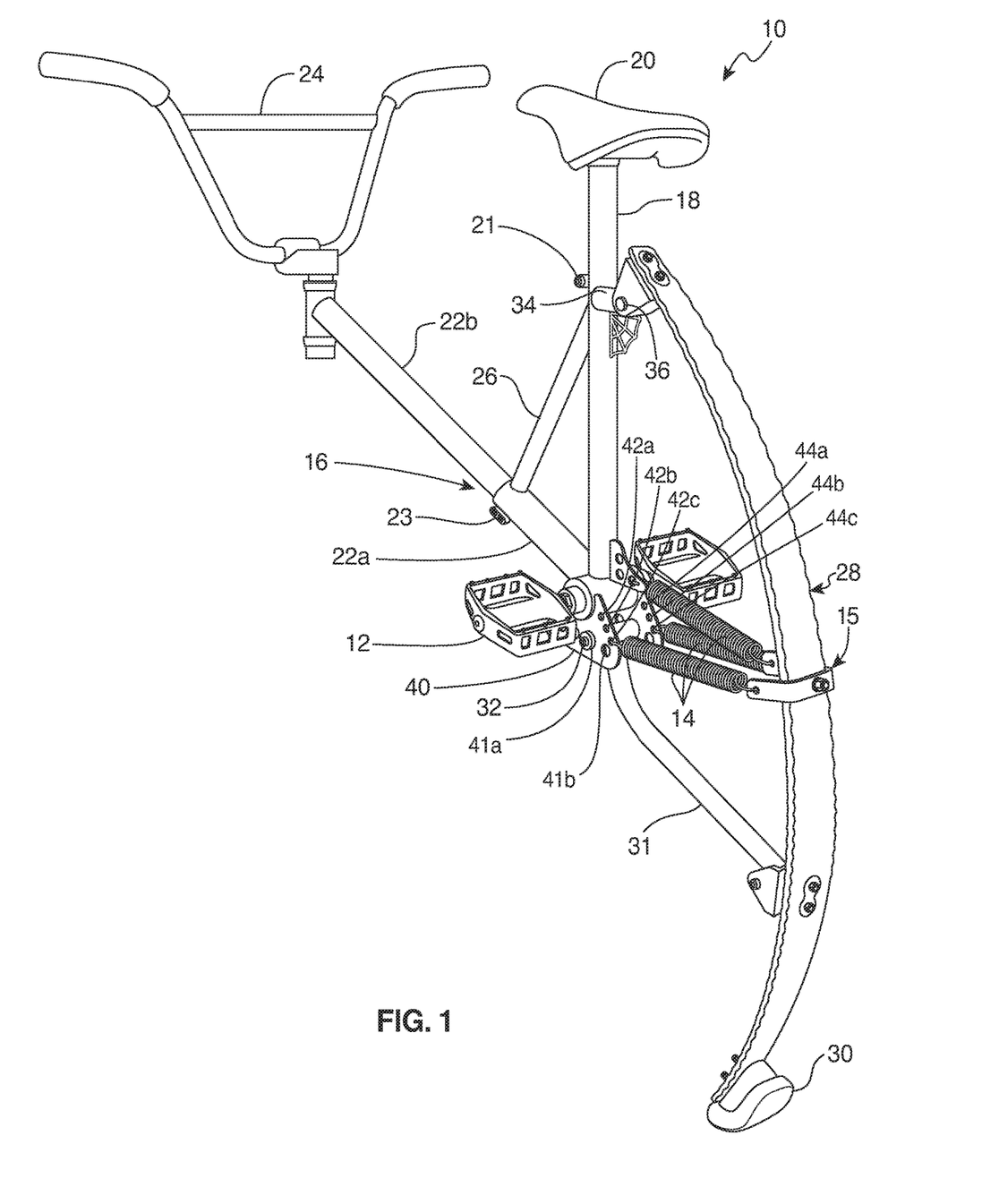
FIG. 1 is a rear perspective view of an example stationary jumping and trick bike.
Figure 2:
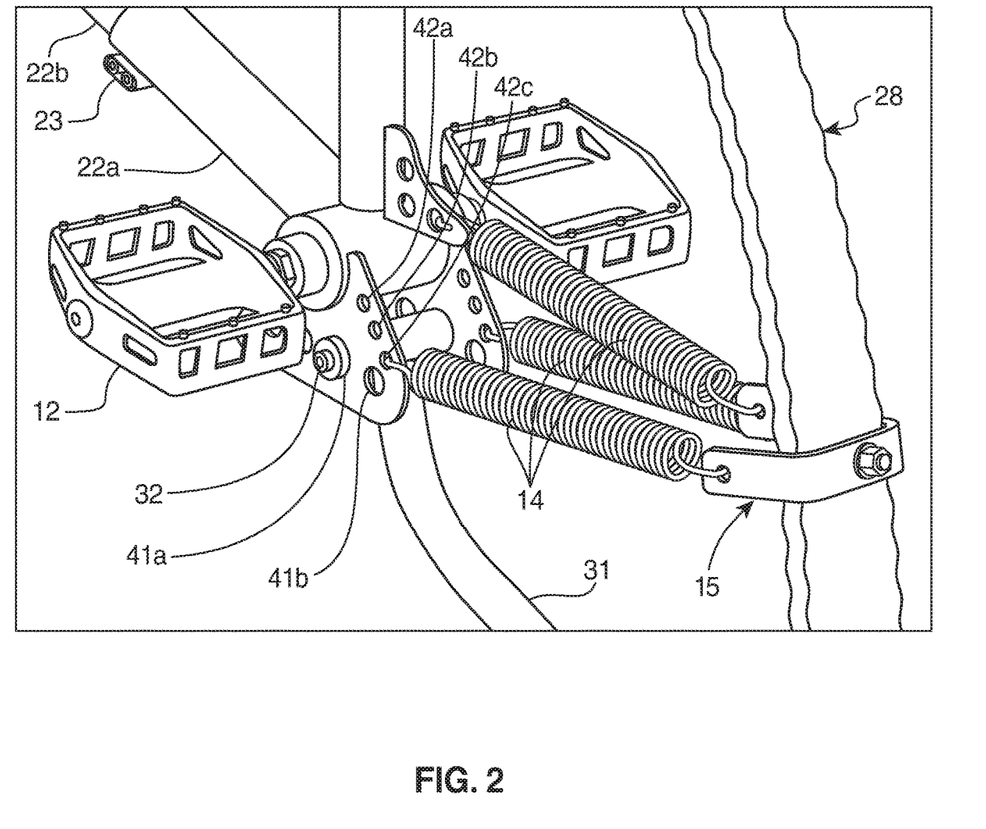
FIG. 2 is a close-up view showing example pedals and tensioners of the stationary jumping and trick bike shown in FIG. 1.
Figure 3:
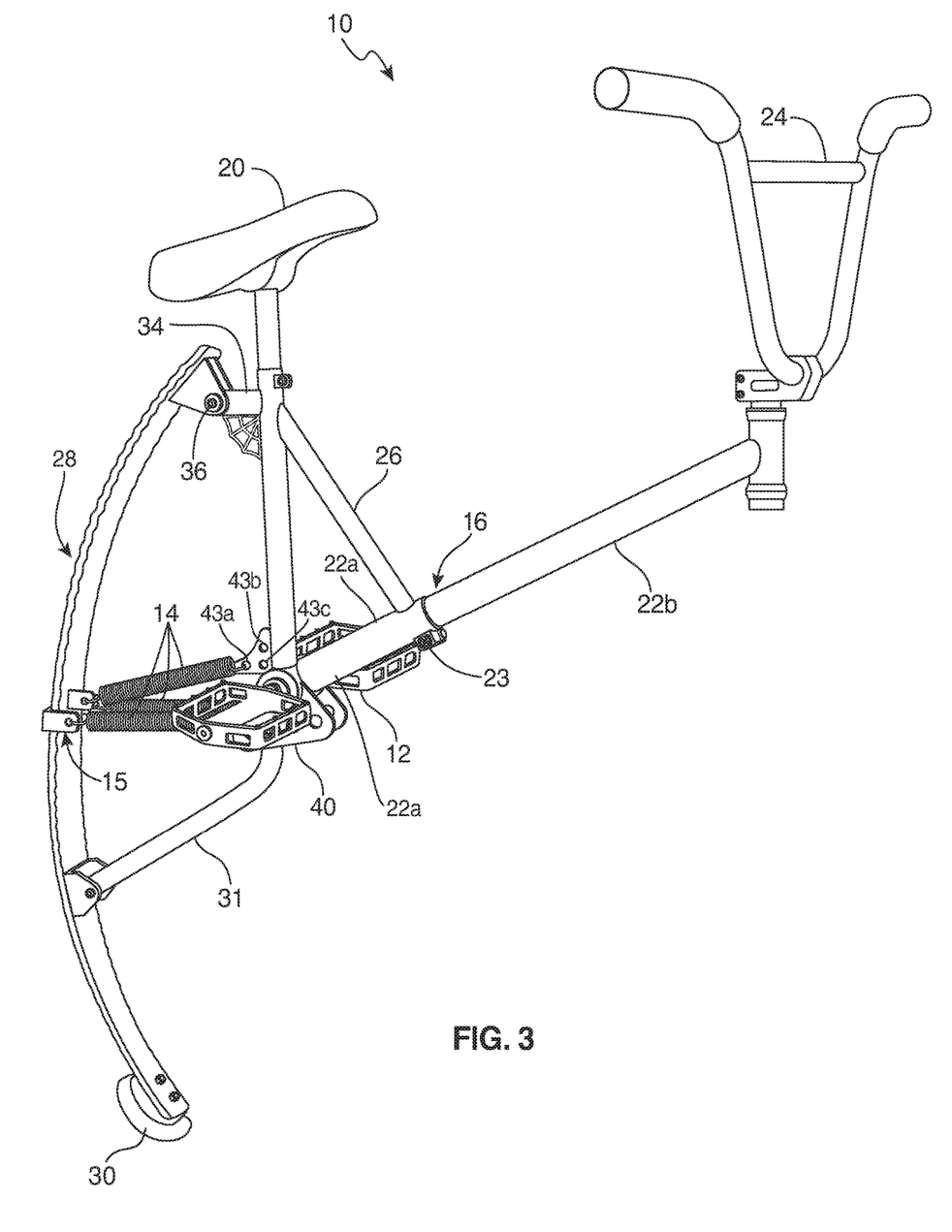
FIG. 3 is a front perspective view of the example stationary jumping and trick bike shown in FIG. 1.

FIG. 1 is a rear perspective view of an example stationary jumping and trick bike 10. FIG. 2 is a close-up view showing example pedals 12 and tensioners 14 of the stationary jumping and trick bike 10 shown in FIG. 1. FIG. 3 is a front perspective view of the example stationary jumping and trick bike 10 shown in FIG. 1.

The example stationary jumping and trick bike 10 includes a frame assembly 16. The frame assembly 16 includes a first tube member or seat post 18 supporting a seat 20. The seat may be height adjustable (e.g., by loosening fastener 21 and raising/lowering a tube 19 (see, e.g., FIGS. 5 and 6) attached to the seat 20 by sliding it within the seat post 18.

Figure 4:
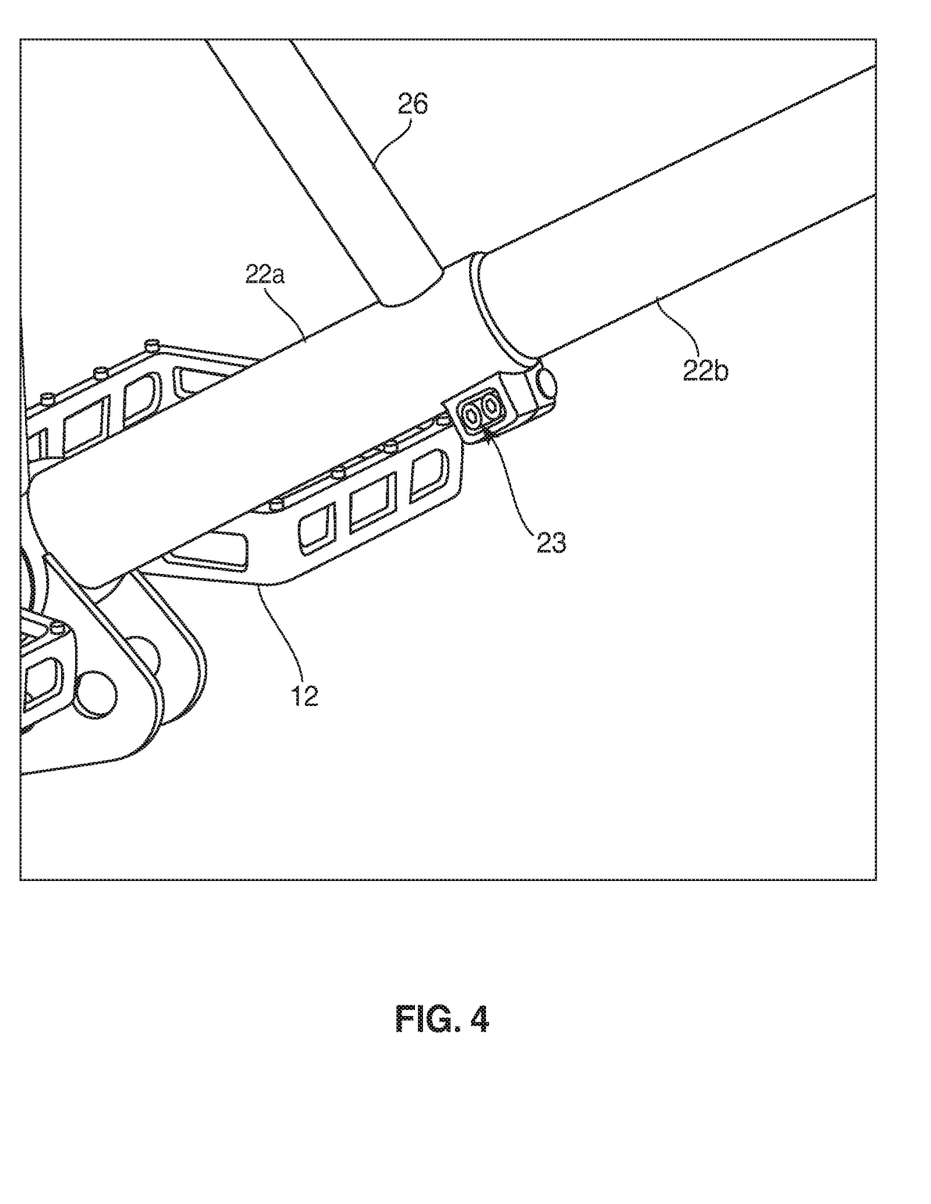
FIG. 4 is a close-up view showing an example adjustable handlebar post member of the stationary jumping and trick bike shown in FIG. 1.

A second tube member 22a-b connects to the handlebar 24. FIG. 4 is a close-up view showing an example adjustable handlebar post member 22a-b of the stationary jumping and trick bike shown in FIG. 1. The second tube member includes a base tube 22a and an extension tube 22b slidably engaging therein to extend and retract the handlebar second tube member and hence the handlebar 24, e.g., for distance of height adjustment. In an example, tube 22b is referred to as a "boom bar" and provides reach adjustment (e.g., the user's arm reach). The boom bar 22b attaches to the head tube, the stem attaches to the pin that goes through the head tube and the handlebars mount to the stem. Different size "head tube pins" allow for the use of either BMX or MTB handlebars. The tubes 22a and 22b can be secured at the desired position, e.g., by fastener 23.

A third tube member or support post 26 provides support between the first tube member 18 and the second tube member 22a-b.

The example stationary jumping and trick bike 10 also includes a foot rest on the frame assembly 16. In an example, the foot rest includes pedals 12. In another example, the foot rest includes posts 12' (see, e.g., FIGS. 5-7).

The example stationary jumping and trick bike 10 also includes a leg member 28 pivotably attached to a rearward portion the frame assembly 16, e.g., at the intersection of the first tube member 18 and the second tube member 22*a-b*. In an example, the leg member 28 may include a leaf spring (e.g., a multi-layered spring). However, other mechanisms may also be provided, such as but not limited to a single layered spring a carbon fiber or other semi-flexible material, a hydraulic spring, an air spring. In an example, the leg member 28 has a semi-circular or crescent shape. However, other shapes are also contemplated as being suitable.

A standing and/or seated user holding the handlebar 24 on the frame assembly 16 can practice jumps and tricks by lifting and landing a lower portion of the leg member 28 on a solid surface (e.g., the floor, wall, or other suitable surface). A dampener 30 may be provided on the lower portion of the leg member 28. The dampener 30 may be a rubber foot to reduce or altogether prevent damage to the floor or other surface on which the stationary jumping and trick bike 10 is being used.

In an example, the leg member 28 is pivotally attached at two spaced apart positions on the frame assembly 16. For example, the leg member 28 may be pivotally attached at an intersection of the first tube member 18 and the second tube member 22*a-b*, as seen in detail in FIG. 2. A connecting member or shaft 32 may pivotally attach the leg member 28 to the intersection of the first tube member 18 and the second tube member 22*a-b*. In an example, the leg member 28 is pivotally attached to an upper position 34 on the first tube member below the seat, e.g., at pivot 36.

In an example, at least one tensioner 14 is connected between the leg member 18 and the frame assembly 16, e.g., at bracket 15 attached to the leg member 18. In FIG. 1, three tensioners are shown. In the example shown in FIG. 5, 2 tensioners are provided. Other examples including more or less tensioners may also be provided. The tensioner 14 is selectable by weight rating to increase and decrease stiffness of the leg member based on user size.

In an example, the tensioner is a coil spring. In another example, the tensioner may be a tension band. Coil springs, tension bands or mechanical coil springs can be added to increase stiffness to the leaf spring 28 and also help with recoil (or POP). Coil springs or tension bands may attach/connect at the middle area of the leaf spring and then attach/connect around the area of the bottom bracket. Coil Springs and tension bands may be weight rated so that the user can select the right amount of resistance for their body weight. Multiple coil springs and tension bands can be added or removed to adjust stiffness and recoil.

The stationary jumping and trick bike 10 may also include a bracket 40 on the frame assembly 16. The bracket 40 may include a plurality of leg member ports 41*a* and 41*b* (although any number of ports may be provided). The ports 41*a* and 41*b* are selectable for pivotably attaching the leg member 28 via leaf spring pivotal arm 31 to the frame assembly 16. This allows the user to adjust pitch and/or angle of attachment of the leg member 28 by removing the pin or shaft 32 and moving the leaf spring pivotal arm 31 from one port (e.g., port 41*a*) to another port (e.g., port 41*b*) and reinserting the pin 32.

The bracket 40 may also include a plurality of ports 42*a-c*, 43*a-c*, and 44*a-c* (although any number of ports may be provided). The ports 42*a-c* are selectable for attaching the tensioner(s) 14 to the frame assembly 16. This allows the user to adjust tension by moving the tensioner(s) 14 from one port (e.g., port 42*a*) to another port (e.g., port 42*b* or 42*c*).

Figure 5:
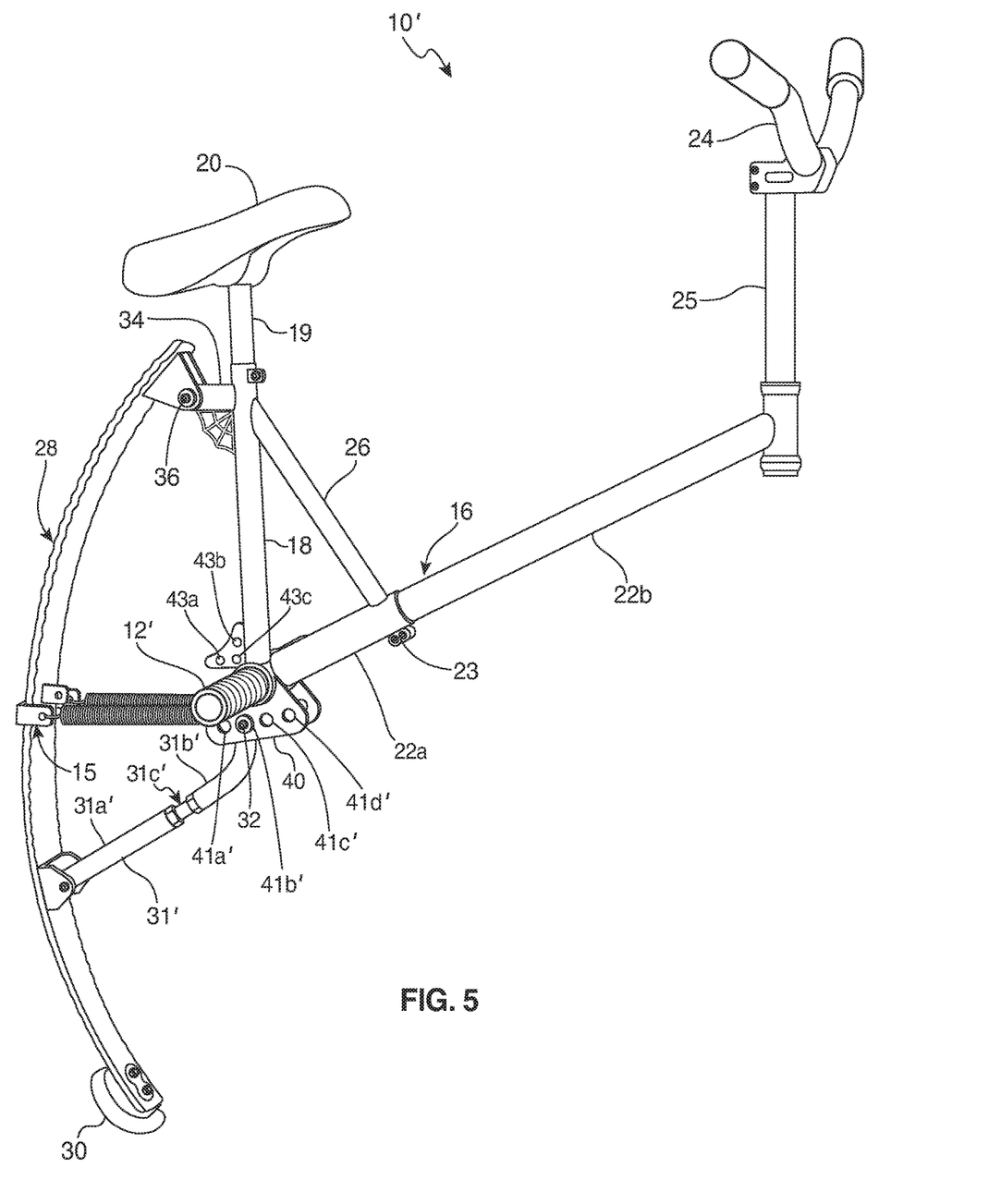
FIG. 5 is a front perspective view of another example stationary jumping and trick bike.
Figure 6:
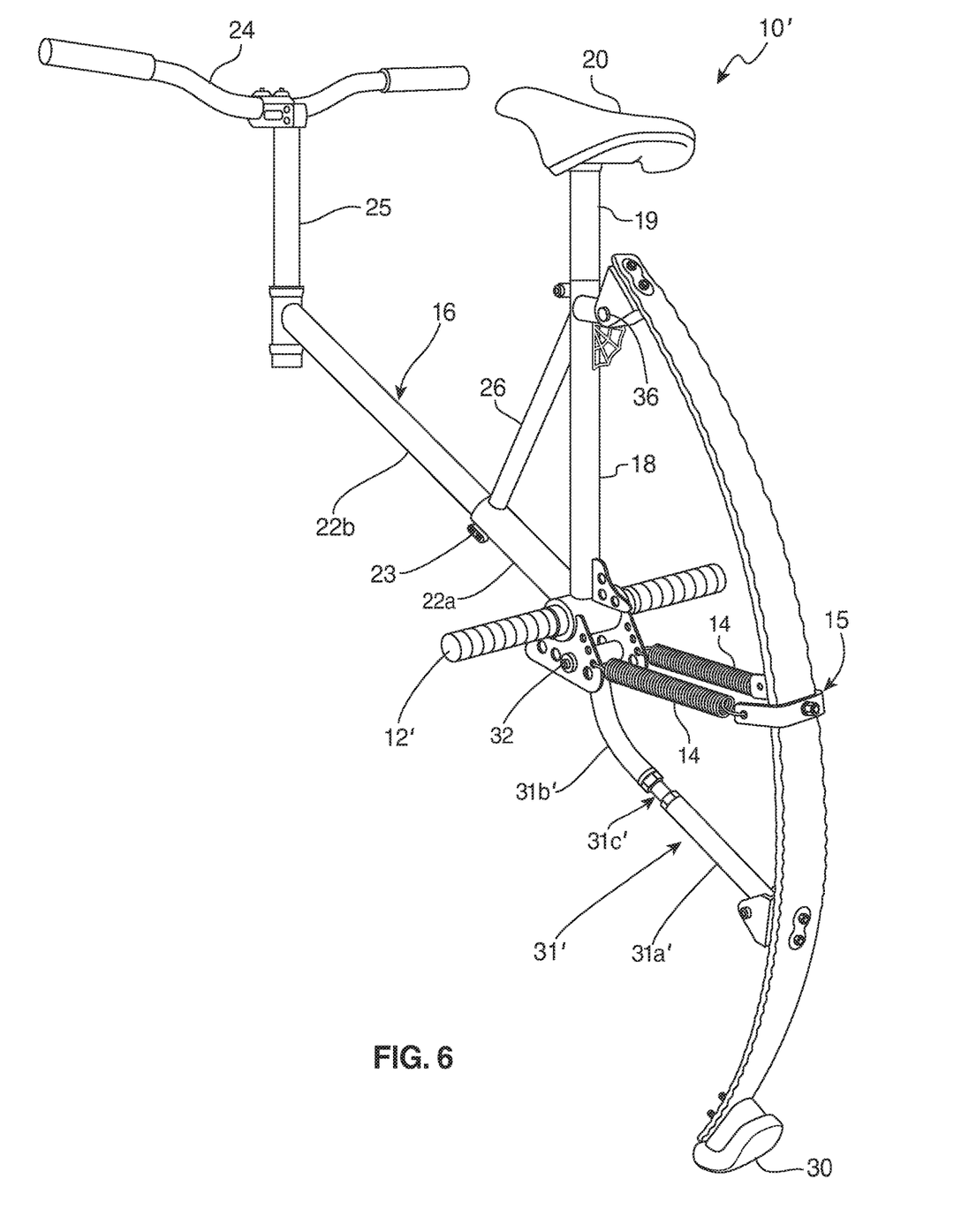
FIG. 6 is a rear perspective view of the example stationary jumping and trick bike shown in FIG. 5.
Figure 7:
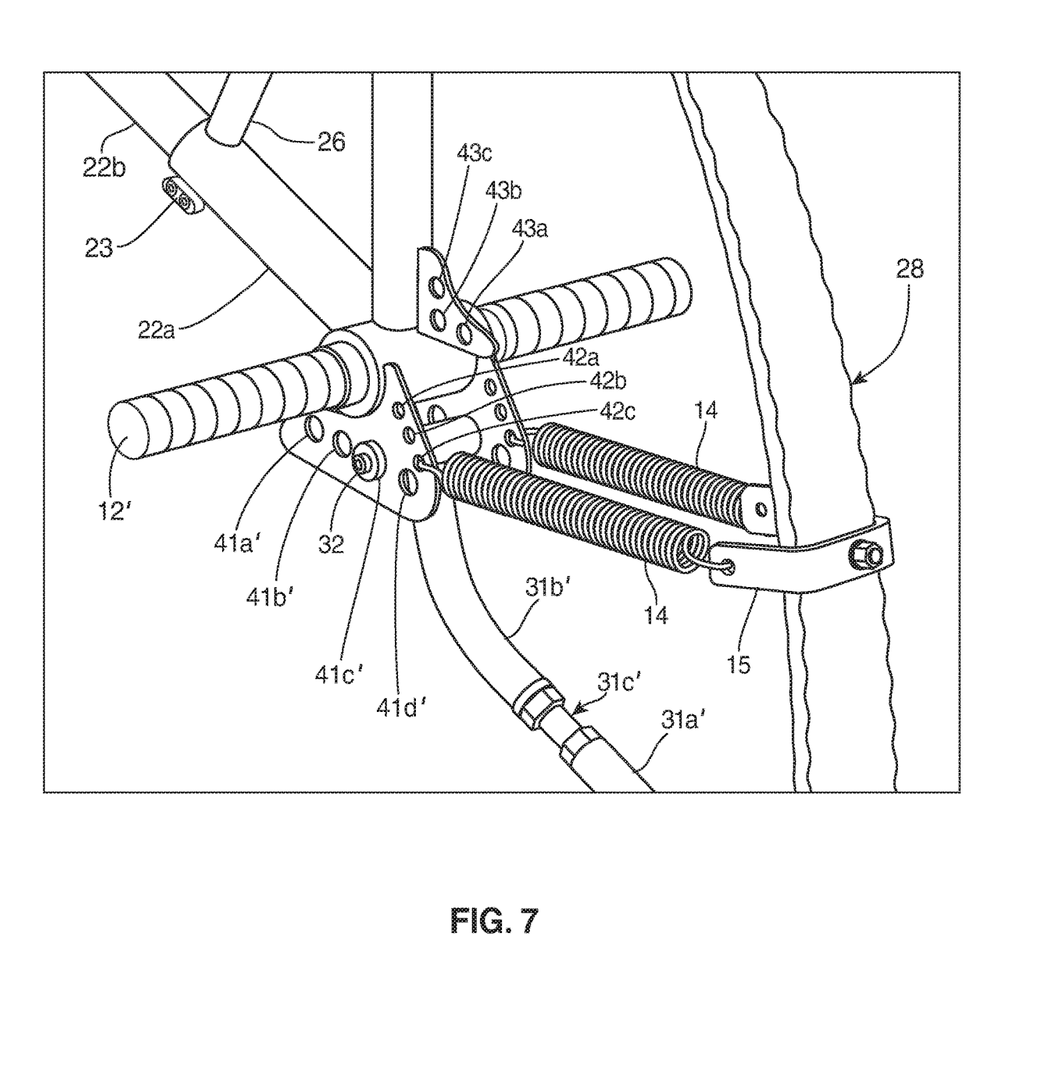
FIG. 7 is a close-up view showing example foot posts and tensioners of the stationary jumping and trick bike shown in FIG. 5.

FIG. 5 is a front perspective view of another example stationary jumping and trick bike 10'. FIG. 6 is a rear perspective view of the example stationary jumping and trick bike shown in FIG. 5. FIG. 7 is a close-up view showing example foot posts and tensioners of the stationary jumping and trick bike shown in FIG. 5. It is noted that like components are referred to by the same reference numbers and may not be described again with specific reference to these figures. The prime (') designation indicates variations of the components already described above of the same reference number.

Again, the example stationary jumping and trick bike 10' includes a frame assembly 16 with handlebar 24 and optional posts 12'. A leg 28 is pivotally attached to the frame assembly 16. During use, a standing and/or seated user holding the handlebar 24 on the frame assembly can practice jumps and tricks by landing a lower portion of the spring mechanism on a solid surface. It is noted that the handlebar 24 is shown adjusted by extension member 25 for height in FIGS. 5 and 6.

In an example, the leg 28 includes a leaf spring. The leaf spring may be pivotally attached one or more positions on the frame assembly 16. In the figures, the leaf spring is shown as it may be pivotally attached to a lower position on the frame assembly 16 beneath a seat post 18. The leaf spring is also shown as it may be pivotally attached to an upper position on the seat post 18 of the frame assembly 16.

Coil springs, tension bands or mechanical coil springs may be provided to increase stiffness to the leaf spring and also help with recoil (POP). Coil springs or tension bands attach/connect at the middle area of the leaf spring and then attach/connect around the area of the bottom bracket. Coil springs and tension bands may be weight rated so the user can select the right amount of resistance for their body weight. Also multiple coil springs and tension bands can be added or removed to adjust stiffness and recoil.

Adjustment bracket(s) 40 with multiple ports may be provided to allow the user to adjust the pitch/angle of the leaf spring by moving the leaf spring pivotal arm from one port to another, as already described above. This bracket may be located below the bottom bracket of the frame assembly 16. The stationary jumping and trick bike 10' may also include ports 41*a'*-41*d'* are selectable for pivotably attaching the leg member 28 via leaf spring pivotal arm 31' to the frame assembly 16. This allows the user to adjust pitch and/or angle of attachment of the leg member 28 by removing the pin or shaft 32 and moving the leaf spring pivotal arm 31' from one port (e.g., port 41*a*) to another port (e.g., port 41*b*) and reinserting the pin 32. In this example, the leaf spring pivotal arm 31' is further adjustable, e.g., by extending or retracting the arms 31*a'* and 31*b'* via threads 31*c'*.

In an example, the stationary jumping and trick bike 10' includes a dampener 30 on the lower portion of the leaf spring. The dampener 30 may help to reduce or altogether prevent damage to the floor by the spring mechanism. For example, the dampener may be plastic rubber or other softer material than the metal leg member 28.

In an example, the stationary jumping and trick bike 10' includes one or more port or other mounting location to receive a pedal or other foot rest or "peg(s)" on the frame assembly. For example, a pedal or other foot rest may be attached on each of two opposite sides of the frame assembly. The ports or other mounting locations provide options to receive the pedal(s) or other foot rest(s) at different positions on the frame assembly, e.g., for different size users, different tricks, or other user preferences.

In an example, the stationary jumping and trick bike (10 or 10') may be provided in a 20 inch BMX geometry and/or a 26/27.5 MTB or "dirt jumper" geometry. Either BMX or MTB handlebars and pedals may be used with the device, and may be adjustable and MTB/BMX parts compatible to the users liking. In another example, the apparatus is not built with a specific BMX or MTB geometry. The user can adjust the frame tube, seat post, leaf spring pitch/angle. An adjustable/adaptable steer tube which goes through the head tube may allow user to use MTB handlebars. Also a second option frame tube which adds a rise to the head tube may be an alternative to using MTB handlebars.

The stationary jumping and trick bike (10 or 10') may also include 19 mm, 22 mm, 68 mm and 73 mm bottom bracket sizes and/or a stationary standing platform with optional threaded ports for bike pedals. However, it is noted that other device configurations and sizes may also be included and is not limited to any particular configuration or size.

In an example, the stationary jumping and trick bike (10 or 10') may be fully adjustable, with the ability to collapse or extend nearly every component for the user's preferences.

Before continuing, it should be noted that the examples described above are provided for purposes of illustration, and are not intended to be limiting. Other devices and/or device configurations may be utilized to carry out the operations described herein.

In an example, the components and connections depicted in the figures may be used. The operations shown and described herein are provided to illustrate example implementations. It is noted that the operations are not limited to the ordering shown. Still other operations may also be implemented.

It is noted that the examples shown and described are provided for purposes of illustration and are not intended to be limiting. Still other examples are also contemplated.

The invention claimed is:

1. A stationary jumping and trick bike, comprising:
   a frame assembly;
   a handlebar on a forward portion of the frame assembly;
   a seat post on a rear portion of the frame assembly;
   a seat on the seat post of the frame assembly;
   a pivot arm movably attached to the frame assembly under the seat post;
   a spring-based leg member pivotably attached on a first end portion of the spring-based leg member to the seat post, and the spring-based leg member pivotably attached on a second end portion of the spring-based leg member to the pivot arm on to a rearward portion the frame assembly; wherein a standing or seated user holding the handlebar on the frame assembly is able to practice jumps and tricks by lifting and landing a lower portion of the spring-based leg member on a solid surface.

2. The stationary jumping and trick bike of claim 1, further comprising a foot rest on the frame assembly.

3. The stationary jumping and trick bike of claim 2, wherein the foot rest is a pedal.

4. The stationary jumping and trick bike of claim 2, wherein the foot rest is a post.

5. The stationary jumping and trick bike of claim 1, further comprising a bracket on the frame assembly, the bracket having a plurality of ports selectable for pivotably attaching the spring-based leg member to the frame assembly to adjust pitch and/or angle of attachment of the spring-based leg member.

6. The stationary jumping and trick bike of claim 1, further comprising a dampener on the lower portion of the spring-based leg member.

7. The stationary jumping and trick bike of claim 1, wherein the spring-based leg member is a leaf spring.

8. The stationary jumping and trick bike of claim 1, wherein the seat is height adjustable.

9. The stationary jumping and trick bike of claim 1, wherein the frame assembly includes a first tube member supporting the seat, a second tube member connecting to the handlebar, and a third tube member providing support between the first tube member and the second tube member.

10. The stationary jumping and trick bike of claim 9, wherein the second tube member includes an extension tube slidably engaging therein to extend and retract the handlebar for height adjustment.

11. The stationary jumping and trick bike of claim 9, wherein the spring-based leg member is pivotally attached at two spaced apart positions on the frame assembly.

12. The stationary jumping and trick bike of claim 11, wherein the spring-based leg member is pivotally attached at an intersection of the first tube member and the second tube member.

13. The stationary jumping and trick bike of claim 12, further comprising a connecting member to pivotally attach the spring-based leg member to the intersection of the first tube member and the second tube member.

14. The stationary jumping and trick bike of claim 12, wherein the the spring-based leg member is pivotally attached to an upper position on the first tube member below the seat.

15. The stationary jumping and trick bike of claim 1, further comprising at least one tensioner connected between the spring-based leg member and the frame assembly.

16. The stationary jumping and trick bike of claim 15, wherein the at least one tensioner is selectable by weight rating to increase and decrease stiffness of the spring-based leg member based on user size.

17. A stationary jumping and trick bike, comprising:
    a frame assembly;
    a handlebar on a forward portion of the frame assembly;
    a seat post on a rear portion of the frame assembly;
    a seat on the seat post of the frame assembly;
    a pivot arm movably attached to the frame assembly under the seat post;
    an arcuate shaped spring-based leg member pivotably attached to a rearward portion of the frame assembly, the arcuate shaped spring-based leg member including attached between the seat post and the pivot arm
    a foot rest on the frame assembly;
    wherein a standing or seated user
    holding the handlebar on the frame assembly is able to practice jumps and tricks by lifting and landing a lower portion of the arcuate shaped spring-based leg member on a solid surface.

18. The stationary jumping and trick bike of claim 17, further comprising a bracket on the frame assembly, the bracket having a plurality of ports selectable for pivotably attaching the arcuate shaped spring-based leg member to the frame assembly to adjust pitch and/or angle of attachment of the arcuate shaped spring-based leg member.

19. The stationary jumping and trick bike of claim 17, further comprising at least one tensioner connected between the arcuate shaped spring-based leg member and the frame assembly.

20. A stationary jumping and trick bike, comprising:
- a frame assembly having a handlebar on a forward portion of the frame assembly and a seat on a seat post of the frame assembly;
- a leaf spring member attached on a first end portion of the leaf spring member to the seat post;
- a bracket on the frame assembly, the bracket having a plurality of ports selectable for pivotably attaching the leaf spring member on a second end portion of the leaf spring member to the frame assembly to adjust pitch and/or angle of attachment of the leaf spring member; and
- a plurality of tensioners connected on a first end of each of the plurality of tensioners between the first end portion of the leaf spring member and the second end portion of the leaf spring member, and the plurality of tensioners further connected on a second end of each of the plurality of tensioners to the frame assembly.

* * * * *